(12) United States Patent
Dides

(10) Patent No.: US 10,496,246 B2
(45) Date of Patent: *Dec. 3, 2019

(54) COLLABORATIVE DATA BASED DEVICE MAINTENANCE

(71) Applicant: eBay Inc., San Jose, CA (US)

(72) Inventor: Emil Dides, Coppell, TX (US)

(73) Assignee: eBay Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/684,106

(22) Filed: Aug. 23, 2017

(65) Prior Publication Data

US 2017/0351390 A1 Dec. 7, 2017

Related U.S. Application Data

(63) Continuation of application No. 14/588,258, filed on Dec. 31, 2014, now Pat. No. 9,746,998.

(51) Int. Cl.
| G06F 3/048 | (2013.01) |
| G06F 3/0482 | (2013.01) |
| G06Q 10/06 | (2012.01) |
| G06Q 30/06 | (2012.01) |
| H04L 12/28 | (2006.01) |
| G06F 3/0484 | (2013.01) |

(52) U.S. Cl.
CPC ....... *G06F 3/0482* (2013.01); *G06Q 10/0631* (2013.01); *G06Q 30/0643* (2013.01); *H04L 12/2825* (2013.01); *G06F 3/0484* (2013.01)

(58) Field of Classification Search
CPC combination set(s) only.
See application file for complete search history.

(56) References Cited

U.S. PATENT DOCUMENTS

| 2007/0072547 A1* | 3/2007 | Sims, III | G05B 19/4184 455/39 |
| 2007/0136145 A1* | 6/2007 | Uchida | G06Q 30/0617 705/26.7 |
| 2007/0260366 A1 | 11/2007 | Lacaze et al. | |
| 2011/0202293 A1 | 8/2011 | Kobraei et al. | |
| 2013/0060359 A1 | 3/2013 | Kim et al. | |
| 2013/0188046 A1 | 7/2013 | Kong | |
| 2015/0039176 A1 | 2/2015 | Fish | |

* cited by examiner

*Primary Examiner* — Pei Yong Weng

(74) *Attorney, Agent, or Firm* — Shook, Hardy & Bacon L.L.P.

(57) ABSTRACT

Systems and methods for collaborative data based device maintenance are provided. In example embodiments, an indication of a malfunction of a user product of a user is received. An item listing is identified based, in part, on user data of another user. An order parameter for an order corresponding to the item listing is determined based on user data of the user and the other user.

18 Claims, 12 Drawing Sheets

COLLABORATIVE DATA BASED DEVICE MAINTENANCE

CROSS REFERENCE TO RELATED APPLICATIONS

This application is a continuation application and claims priority to U.S. patent application Ser. No. 14/588,258 filed Dec. 31, 2014, and entitled "COLLABORATIVE DATA BASED DEVICE MAINTENANCE." The disclosure of this prior application is considered part of this application, and is hereby incorporated by reference in its entirety.

TECHNICAL FIELD

Embodiments of the present disclosure relate generally to computer technology and, more particularly, but not by way of limitation, to collaborative data based device maintenance.

BACKGROUND

Modern life offers a variety of machines and devices to perform an ever increasing number of tasks for users. As users' reliance on such devices increases, the importance of maintaining such devices tends to increase. Maintenance of such a variety of devices can be unpredictable and burdensome to users.

BRIEF DESCRIPTION OF THE DRAWINGS

Various ones of the appended drawings merely illustrate example embodiments of the present disclosure and should not be considered as limiting its scope.

Figure 1:
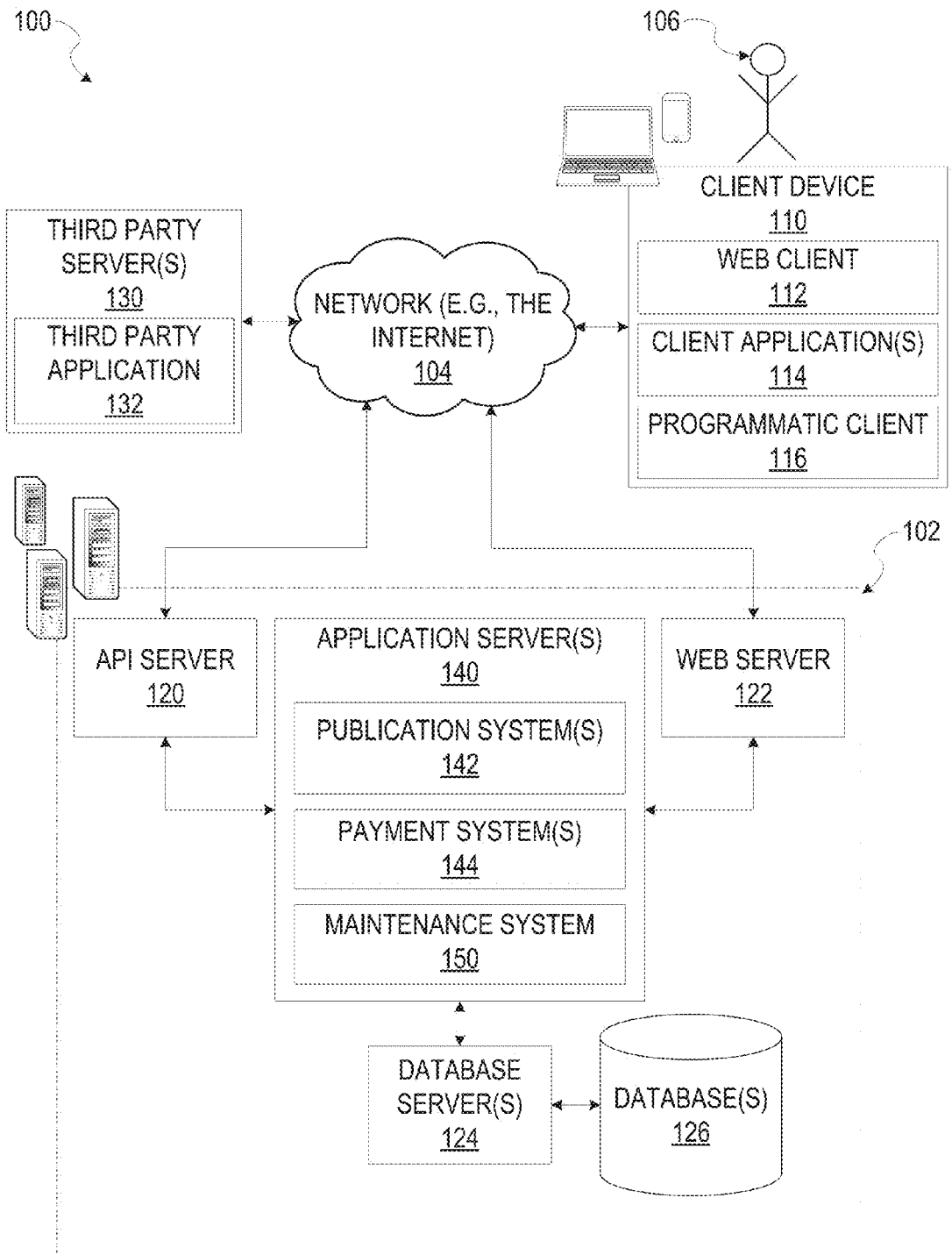
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As the variety of consumer devices (e.g., smart appliances or cars) increases, the burden of maintaining such devices tends to increase. A typical consumer can utilize consumer devices from a diverse array of manufacturers that each have peculiarities associated with maintenance (e.g., special components or special maintenance procedures for a particular consumer). To assist users in maintaining consumer devices (herein, also referred to as user products), in various example embodiments, systems and methods for collaborative data based device maintenance are provided herein.

In various example embodiments, a maintenance system (e.g., included in an application server, a maintenance device, or embedded into a user product) receives an indication of a malfunction of a user product of a user. For instance, if a lightbulb of a smart refrigerator burns out, the maintenance system receives an indication of the lightbulb burning out from the smart refrigerator. The maintenance system identifies a component of the user product corresponding to the malfunction (e.g., the indication of the malfunction includes an indication of the component). The maintenance system accesses user data of another user, or multiple other users, that is associated with the user product. For example, the user data includes purchase histories of the another user associated with a similar user product. The maintenance system identifies an item listing associated with the component based, in part, on the user data of the another user. For example, the maintenance system identifies a replacement lightbulb for the smart refrigerator based on replacement lightbulbs purchased by the another user for a same or similar smart refrigerator.

Once the maintenance system identifies the item listing, the maintenance system accesses user data of the user. The maintenance system determines one or more order parameters for an order corresponding to the item listing based on the user data of the user and the another user. For example, if the maintenance system determines that the user likely desires a speedy resolution to the malfunction, the maintenance system determines order delivery parameters according to the desire for a speedy resolution to the malfunction (e.g., an order parameter comprising a fastest available delivery option). The maintenance system then causes presentation of a recommendation, on a user interface of a user device of the user, to place the order corresponding to the item listing using the determined one or more order parameters. In some embodiments, the maintenance system automatically executes the order on behalf of the user according to dynamically determined or user specified rules or criteria associated with automatic maintenance (e.g., if an order value is below a threshold value, automatically execute the order).

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the INTERNET EXPLORER® browser developed by MICROSOFT® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (e-mail) apps, and e-commerce site apps (also referred to as "marketplace apps"). In some implementations, the client application(s) 114 include various components operable to present information to the user and communicate with the networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120. The programmatic client 116 can, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 116 and the networked system 102.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server(s) 140. The application server(s) 140 can host one or more publication system(s) 142, payment system(s) 144, and a maintenance system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s) 142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 provides a number of publication functions and services to the users that access the networked system 102. The payment system(s) 144 likewise provides a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

In some implementations, the maintenance system 150 provides functionality to facilitate device maintenance using collaborative data. In some example embodiments, the maintenance system 150 communicates with the client device 110, the third party server(s) 130, the publication system(s) 142 (e.g., retrieving listings), and the payment system(s) 144 (e.g., purchasing an item in a listing). In an alternative example embodiment, the maintenance system 150 is a part of the publication system(s) 142. The maintenance system 150 will be discussed further in connection with FIG. 2 below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 and the payment system(s) 144) can also be implemented as standalone software programs, which do not necessarily have networking capabilities.

Figure 2:
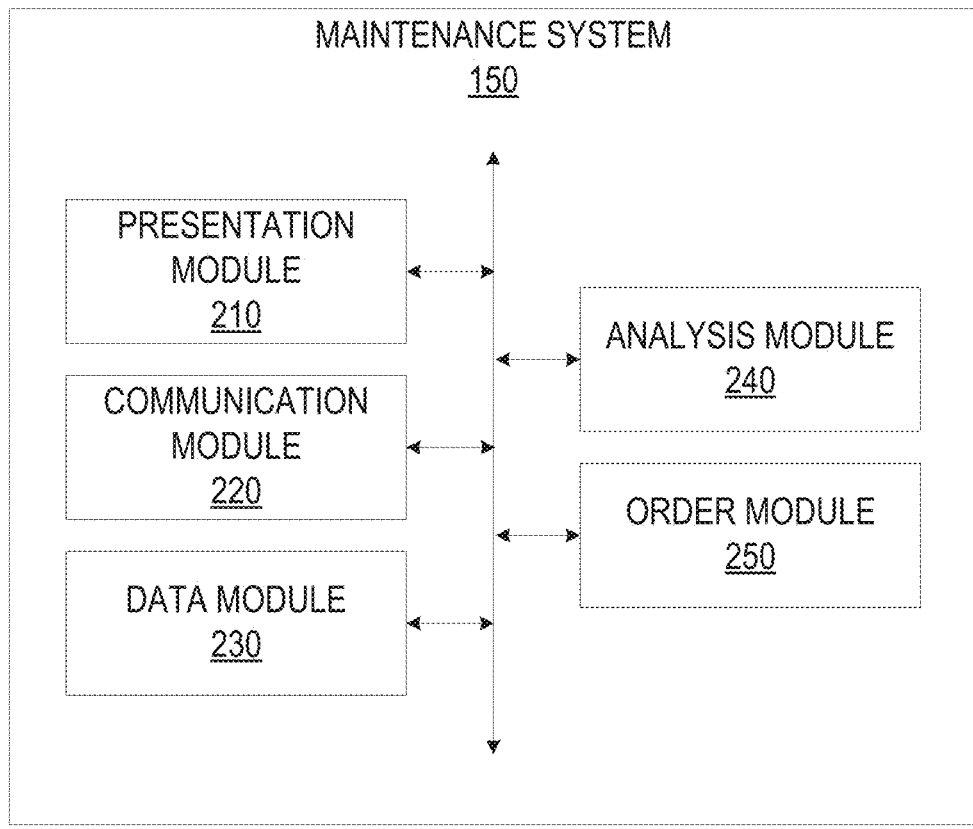
FIG. 2 is a block diagram illustrating an example embodiment of a maintenance system, according to some example embodiments.

FIG. 2 is a block diagram of the maintenance system 150 that provides functionality to facilitate device maintenance using collaborative data. In an example embodiment, the maintenance system 150 includes a presentation module 210, a communication module 220, a data module 230, an analysis module 240, and an order module 250. All, or some, of the modules 210-250 of FIG. 2, communicate with each other, for example, via a network coupling, shared memory, and the like. It will be appreciated that each module can be implemented as a single module, combined into other modules, or further subdivided into multiple modules. Other modules not pertinent to example embodiments can also be included, but are not shown.

In some implementations, the presentation module 210 provides various presentation and user interface functionality operable to interactively present (or cause presentation) and receive information from the user. For instance, the presentation module 210 can cause presentation of various notifications or user interfaces that provide the user an option to make a purchase associated with the identified item listings. In various implementations, the presentation module 210 presents or causes presentation of information (e.g., visually displaying information on a screen, acoustic output, haptic feedback). Interactively presenting information is intended to include the exchange of information between a particular device and the user. The user may provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors). It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In a specific example, the communication module 220 receives an indication of a malfunction of a user product from the user product. In various example embodiments, the network communication can operate over wired or wireless modalities. Web services are intended to include retrieving information from the third party server(s) 130, the database(s) 126, and the application server(s) 140. In some implementations, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The data module 230 provides functionality to access, retrieve, or otherwise obtain data from a variety of sources. For example, the data module 230 accesses user data associated with the user or another user from the third party servers 130 (e.g., social networking data such as posts, likes, follows, friends, or check-ins), the publication systems 142 or the payments systems 144 (e.g., purchase history data), the client device 110, or other sources.

The analysis module 240 provides functionality to perform various analyses to facilitate collaborative data based device maintenance. For example, the analysis module 240 identifies item listings, calculates a rating or score for products, determines candidate appointment time based on calendar data of the user, or determines satisfaction of various rules and criteria.

The order module 250 provides functionality to facilitate a purchase of an item associated with an item listings. For example, the order module 250 assists the user in ordering an item of a particular item listing using order parameters such as a purchase time, a quantity, a delivery time, a delivery type, and so forth.

Figure 3:
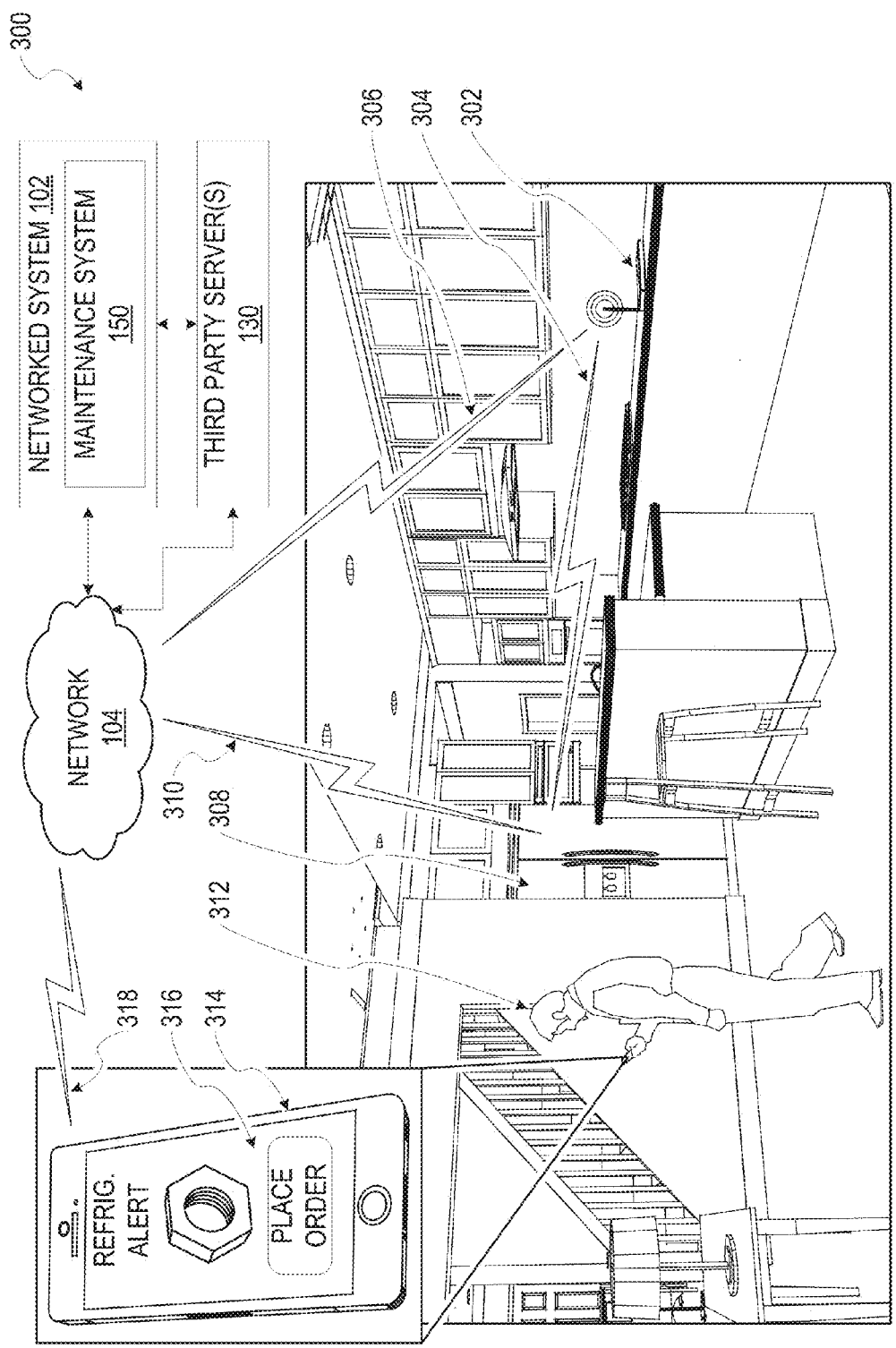
FIG. 3 is a diagram illustrating an example of the maintenance system providing collaborative data based device maintenance, according to some example embodiments.

FIG. 3 is a diagram 300 illustrating an example of the maintenance system 150 providing collaborative data based device maintenance. In the diagram 300, a maintenance device 302 is communicatively coupled to the network 104 via a communication link 306 and a user product 308 via communication link 304 allowing for an exchange of data among the maintenance device 302, the networked system 102, the third party servers 130, and the user product 308. Similarly, in some embodiments, the user product 308 is communicatively coupled, or directly communicatively coupled, to the maintenance device 302 allowing for an exchange of data between the user product 308 and the maintenance device 302 without the use of the network 104. In some instances, the user product 308 is communicatively coupled to the network 104 via communication link 310 allowing for an exchange of data between the user product 308 and various devices and machines communicatively coupled to the network 104. In the diagram 300, a user 312 is carrying a user device 314 that is displaying a user interface 316. The user device 314 is communicatively coupled to the network 104 allowing for an exchange of data between the user device 314 and various devices communicatively coupled to the network 104. Although not show in the diagram 300, in some embodiments, the user device 314 is communicatively coupled to the maintenance device 302 without the network 104.

In an example, the user product 308 is an appliance such as a smart refrigerator. In this example, the user product 308 is equipment with sensors to detect malfunctions of the user product 308. For instance, when the user product 308 detects a malfunction such as a water filter being used up or a lightbulb burning out, the user product 308 communicates an indication of the malfunction to the maintenance device 302. In some embodiments, the maintenance device 302 is embedded into the user product 308, and in other embodiments, the maintenance device 302 is embedded in, or implemented by, the networked system 102 (e.g., included in the publication systems 142). In an embodiment, the maintenance device 302 that includes the maintenance system 150 receives the indication of the malfunction of the user product and identifies a component of the user product corresponding to the malfunction. For instance, the indication of the malfunction can include an indication of a component that triggered the malfunction (e.g., a lightbulb of a smart refrigerator burning out). In other embodiments, the maintenance system 150 of the maintenance device 302 monitors data from the user product 308 and detects a malfunction (e.g., a drop or increase in power consumption indicative of a particular malfunction).

After the maintenance system 150 identifies the component, the maintenance system 150 accesses user data of another user that includes data associated with the user product. For example, the user data of the another user can include purchases made by the another user in response to a same or similar malfunction of a same or similar user product of the another user. The maintenance system 150 then identifies an item listings associated with the component based, in part, on the user data of the another user. For example, the maintenance system 150 can identify item listings associated with items similar to items purchased by the another user in response to a same or similar malfunction. In this way, the maintenance system 150 can automatically identify an item listing pertinent or relevant to the malfunction of the user product.

After the maintenance system 150 identifies the item listing, the maintenance system 150 accesses user data of the user. For example, the user data of the user can include a purchase history, maintenance history of other user products of the user, social networking data of the user, calendar data of the user, and so forth. The maintenance system 150 determines order parameters for an order corresponding to the item listing based on the user data of the user and the another user. For example, the order parameters include a purchase time, a quantity, a brand, and so on. In an example, the maintenance system 150 infers a user characteristic of the user being cost conservative and the maintenance system 150 identifies lower cost deliver options for the order. In another example, the maintenance system 150 infers that resolving the malfunction of the user product as soon as possible is desirable to the user and the order parameters, such as delivery time, are determined accordingly (e.g., fastest available delivery).

Subsequent to the maintenance system 150 determining the order parameters, the maintenance system 150 causes presentation of a recommendation, on a user interface of the user device 314 of the user, to place the order corresponding to the item listing using the determined order parameters. In some embodiments, the maintenance system 150 automatically places the order for the item listing on behalf of the user (e.g., when the maintenance system 150 determines the malfunction is severe or a cost associated with the item listing is below a threshold value).

Figure 4:
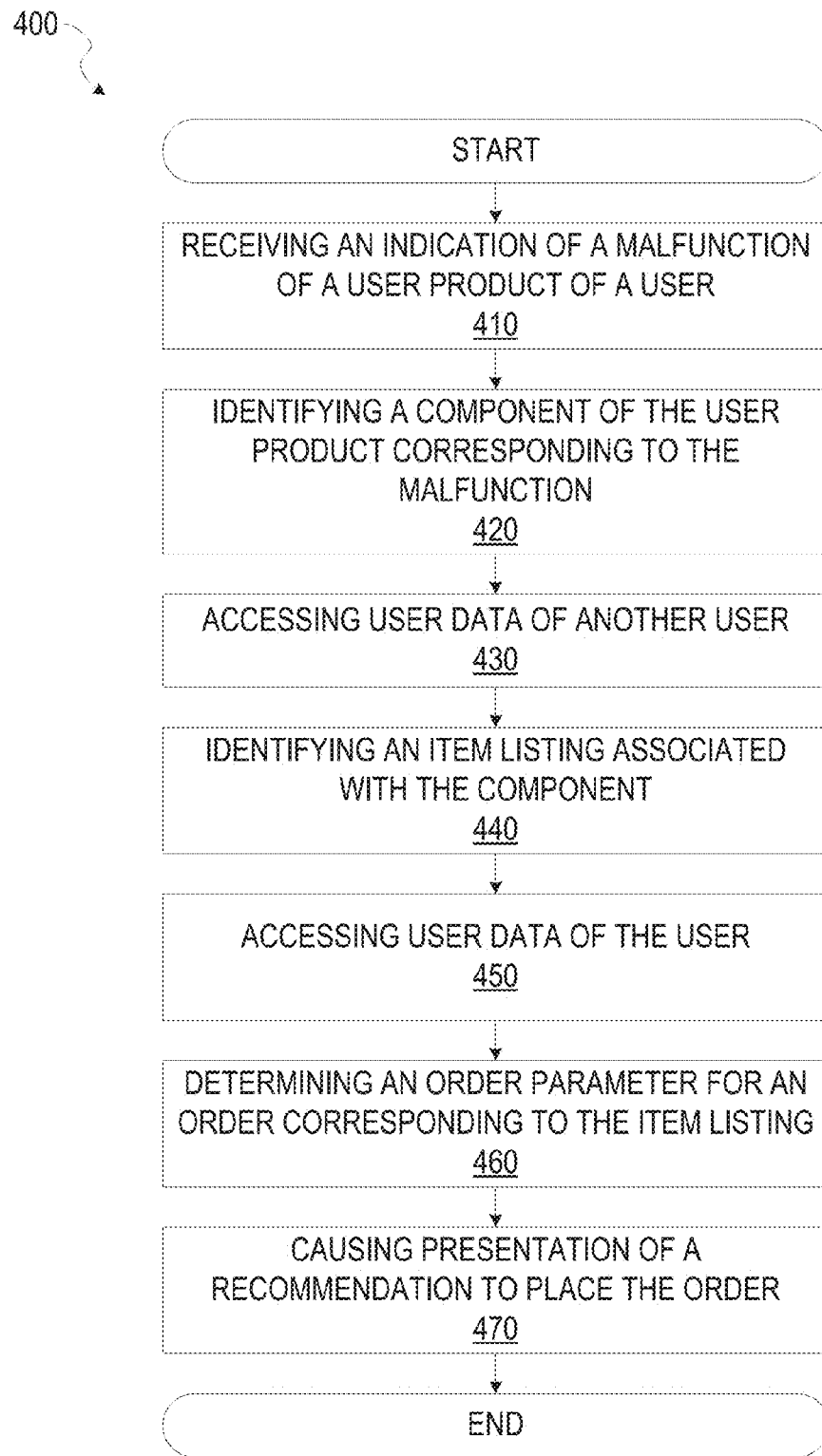
FIG. 4 is a flow diagram illustrating an example method for collaborative data based device maintenance, according to some example embodiments.

FIG. 4 is a flow diagram illustrating an example method 400 for collaborative data based device maintenance. The operations of the method 400 may be performed by components of the maintenance system 150, and are so described below for the purposes of illustration.

At operation 410, the communication module 220 receives an indication of a malfunction of a user product from the user product of a user. For example, the user product of the user can be a smart appliance, such as a smart refrigerator, that is equipment with sensors that monitors various functions of the smart refrigerator. In this example, the smart refrigerator includes a sensor that indicates when a lightbulb of the smart refrigerator burns out or when a water filter of a water dispenser included in the smart refrigerator should be changed.

In other embodiments, the communication module 220 periodically accesses and monitors data of the user product of the user and identifies the indication of the malfunction. For example, the communication module 220 can monitor power consumption of the user product and infer a particular malfunction of the user product based on the power consumption (e.g., a lamp that is drawing a lower amount of power as compared to a historical average of power consumption of the lamp). In this way, the indication of malfunction can be inferred or derived from various data associated with the user product.

In further embodiments, the analysis module 240 predicts the indication of the malfunction of the user product of the user. That is to say, the analysis module 240 predicts a particular malfunction of the user product of the user. For instance, the analysis module 240 can identify a particular malfunction associated with the user product based on temporal information of malfunctions of other users. For example, if a particular malfunction of a particular user product typically occurs after a certain time period has elapsed, the analysis module 240 can generate an indication of the particular malfunction prior to the particular malfunction occurring (e.g., based on 500 other consumers, an Acme brand refrigerator lightbulb typically burns out after 3 years).

At operation 420, the analysis module 240 identifies a component of the user product of the user corresponding to the malfunction. For instance, the analysis module 240 retrieves a product identifier for the user product of the user (e.g., the product identifier is included in the indication of the malfunction of the user product of the user). The analysis module 240 then performs a lookup of a particular component or components associated with the malfunction in a database that stores malfunctions mapped to components for a particular product identifier.

In other embodiments, the analysis module 240 infers the component of the user product of the user corresponding to the malfunction. For instance, the analysis module 240 accesses data that includes purchases associated with a plurality of malfunctions of a same or similar user product. In this instance, the analysis module 240 then matches the malfunction with a particular malfunction among the plurality of malfunctions to identify a purchase made in associated with the malfunction, the identified purchase being indicative of a component associated with the malfunction. In this way, the analysis module 240 dynamically identifies the component of the user product of the user corresponding to the malfunction.

At operation 430, the data module 230 accesses user data of another user, the user data of the another user includes data associated with the user product. For example, the data module 230 stores user data of a plurality of users of the maintenance system 150 or stores user identifiers of users associated with the user product and subsequently retrieves user data using the stored user identifiers. The user data of the another user includes purchase histories, social network data (e.g., posts, likes, checkins), usage data (e.g., amount of time using a particular user product), demographic data (e.g., age, sex, marital status, geolocation, or socioeconomic status), and so forth. The data module 230 accesses, retrieves, or otherwise obtains the user data of the another user from the databases 126, the third party servers 130, user devices of the another user, or other sources.

At operation 440, the analysis module 240 identifies an item listing associated with the component based, in part, on the user data of the another user. For example, the user data of the another user can include purchase histories of users associated with the malfunction of the user product. The analysis module 240 can use the purchase history of the another user to identify item listing pertinent or relevant to the malfunction. For example, if the user product of the user is a particular brand refrigerator that uses a particular brand lightbulb, the analysis module 240 can identify a compatible lightbulb, or another compatible component, for the particular brand refrigerator based on purchases of lightbulbs by other users for the particular brand refrigerator. In this way, the analysis module 240 automatically identifiers compatible components that can resolve the malfunction of the user product of the user.

At operation 450, the data module 230 accesses user data of the user. Similar to the user data of the another user, the user data of the user can include the data discussed above in connection with the operation 430 and the data module 230 can access, retrieve, or otherwise obtain the user data of the user from the sources discussed above in connection with the operation 430.

At operation 460, the order module 250 or the analysis module 240 determines order parameters for an order corresponding to the item listing based on the user data of the user and the another user. The order parameters can include a delivery time (e.g., mornings, between 9 am and 4 pm, or evenings), a delivery date, a delivery type (e.g., standard ground or overnight express), a delivery location, a purchase time, a quantity, a brand, a component specification (e.g., a particular size of a component), and so on. In some embodiments, the order module 250 communicates with the third party servers 130 (e.g., a delivery provider) to determine available order parameters (e.g., delivery options).

In an example embodiment, the analysis module 240 determines a severity score or severity classification for the malfunction of the user product of the user based on the user data of the another user. The severity score is indicative of an urgency to place the order corresponding to the item listing. For instance, if the user data of the another user indicates the another user rapidly (e.g., as compared to an average time to make a purchase associated with a malfunction) purchased a particular item to resolve a particular malfunction, the analysis module 240 determines a higher severity score for the malfunction as compared to a situation where the another user did not rapidly purchase a particular item to resolve a particular malfunction. In another instance, the analysis module 240 determines a higher severity score for a particular user product that has a higher usage rate (e.g., used more often by users) than user products with lower usage rates.

After the analysis module 240 calculates the severity score, in some embodiments, the order module 250 determines the order parameters based on the severity score (e.g., faster delivery option for a highest severity score). In some embodiments, as further discussed below, the analysis module 240 automatically executes the order using the order parameters based on the severity score (e.g., automatically perform the purchase for the item listing with high severity scores).

At operation 470, the presentation module 210 causes presentation of a recommendation, on a user interface of a user device of the user, to place the order corresponding to the item listing using the determined order parameters. For example, the presentation module 210 can cause presentation of a notification on the user device of the user that alerts the user to the malfunction and provides one or more item listings to purchase to resolve the malfunction. The recommendation can includes a variety of information such as the item listings, an indication of other users that have experienced the malfunction of a same or similar user product. In some embodiments, the recommendation includes the severity score.

In further embodiments, the maintenance system 150 can further assist the user in facilitating a resolution to the malfunction of the user product of the user. For example, the data module 230 accesses calendar data included in the user data of the user. The analysis module 240 determines candidate appointment times based on the calendar data of the user. The analysis module 240 or the order module 250 schedules a maintenance appointment with a maintenance provider associated with the order for the item listing and the malfunction of the user product on behalf of the user.

In still further example embodiments, the analysis module 240 identifies a social network service that the another user is a member of using the user data of the another user (e.g., the user data of the another user can indicate a social network handle or other social network identifier of the another user). The analysis module 240 facilities communication between the user and the another user on the identified social network service. In this way, the maintenance system 150 can facilitate communication between the user and someone familiar with the malfunction that may be able to provide additional insight into a resolution to the malfunction.

Figure 5:
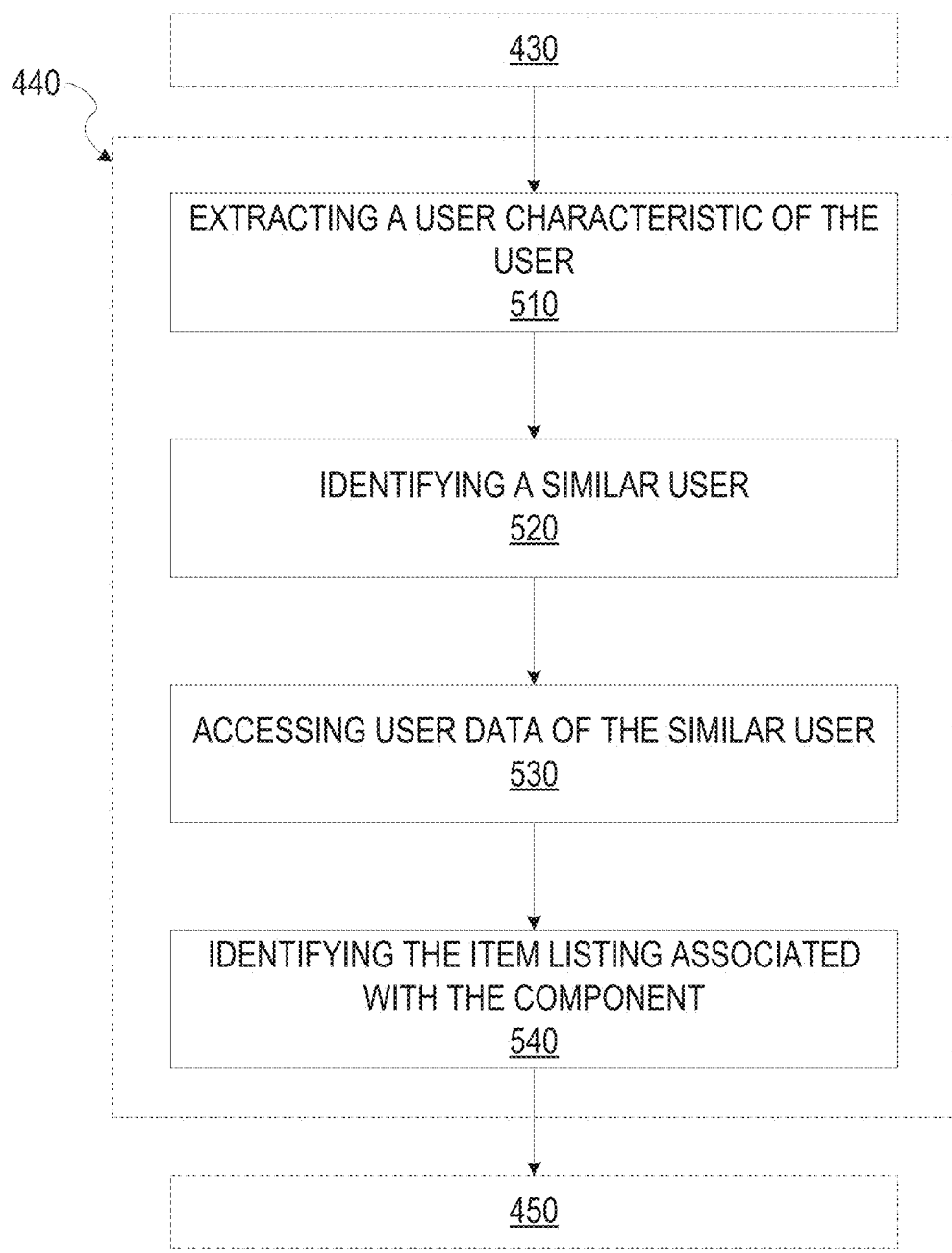
FIG. 5 is a flow diagram illustrating further example operations for identifying an item listing, according to some example embodiments.

FIG. 5 is a flow diagram illustrating further example operations for identifying an item listing, according to some example embodiments. At operation 440, the analysis module 240 identifies the item listing associated with the component based on the user data of the another user. In some embodiments, the operation 440 includes the operations of FIG. 5.

At operation 510, the analysis module 240 extracts one or more user characteristics of the user from the user data of the user. In various example embodiments, a characteristic (e.g., the user characteristic), as used herein, are intended to include traits, qualities, actions, activities, attitudes, habits, behaviors, and the like pertaining to a person or people. Consistent with some embodiments, the user characteristic is associated with behavior in response to a particular malfunction of the determined severity score. For instance, the user characteristic can indicate that the user has a preference or affinity for inexpensive items, purchasing higher quality items, faster delivery in association with certain items, and so forth.

At operation 520, the analysis module 240 identifies a similar user by matching the user characteristic of the user with a user characteristic of the similar user. In various embodiments, the similar user is a particular user among a plurality of users of the maintenance system 150 (e.g., data associated with a plurality of users of the maintenance system 150 is stored for subsequent analysis).

At operation 530, the analysis module 240 accesses user data of the similar user. Similar to the user data discussed above, the user data of the similar user can include the data discussed above in connection with operation 430, and the data module 230 can access, retrieve, or otherwise obtain the user data of the user from the sources discussed above in connection with the operation 430.

At operation 540, the analysis module 240 identifies the item listing associated with the component based on the user data of the similar user. For instance, if the analysis module 240 determines that the user is similar to a particular user that prefers inexpensive goods, the analysis module 240 identifies items listings consistent with the preference for inexpensive goods (e.g., a generic brand or a lowest priced item listing among similar item listings). In this way, the maintenance system 150 assists the user in resolving the malfunction in a way that is intelligently personalized to the user.

Figure 6:
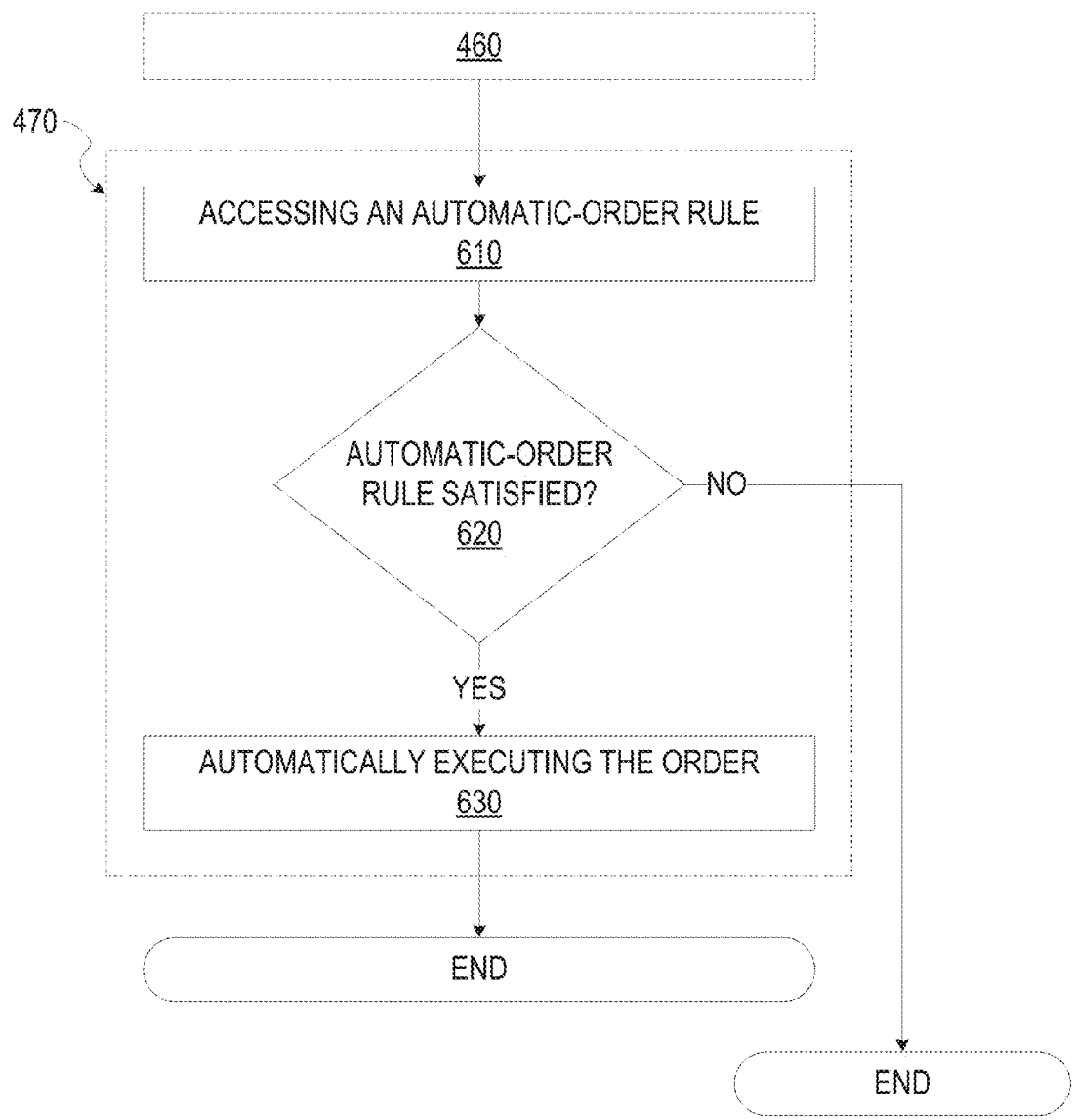
FIG. 6 is a flow diagram illustrating further example operations for collaborative data based device maintenance, according to some example embodiments.

FIG. 6 is a flow diagram illustrating further example operations for collaborative data based device maintenance, according to some example embodiments. As discussed above, at operation 470, the presentation module 210 causes presentation of a recommendation to place the order corresponding to the item listing using the determined order parameters. In some embodiments, the operation 470 includes the operations of FIG. 6.

At operation 610, the data module 230 accesses an automatic-order rule associated with the user. For example, the user can specify automatic-order rules or criteria at a user interface configured to receive such data. In other embodiments, the analysis module 240 dynamically determines an automatic-order rule based on the user data of the user and the another user. For example, the analysis module 240 can infer that the user desires certain items be purchased automatically based on historical purchases of the user or a similar user.

At operation 620, the analysis module 240 determines satisfaction of the automatic-order rule. For example, if the automatic-order rule specifies that purchases below five dollars are automatically purchased and the order parameters indicate that the purchase value is below five dollars, the analysis module 240 determines that the automatic-order rule is satisfied and proceeds to execute the order. If the automatic-order rule is not satisfied, the analysis module 240 does not execute the order.

At operation 630, the order module 250 automatically performs the order corresponding to the item listing on behalf of the user. In some embodiments, the presentation module 210 causes presentation of a user interface that indicates that the order has been executed to notify the user of such activity.

Figure 7:
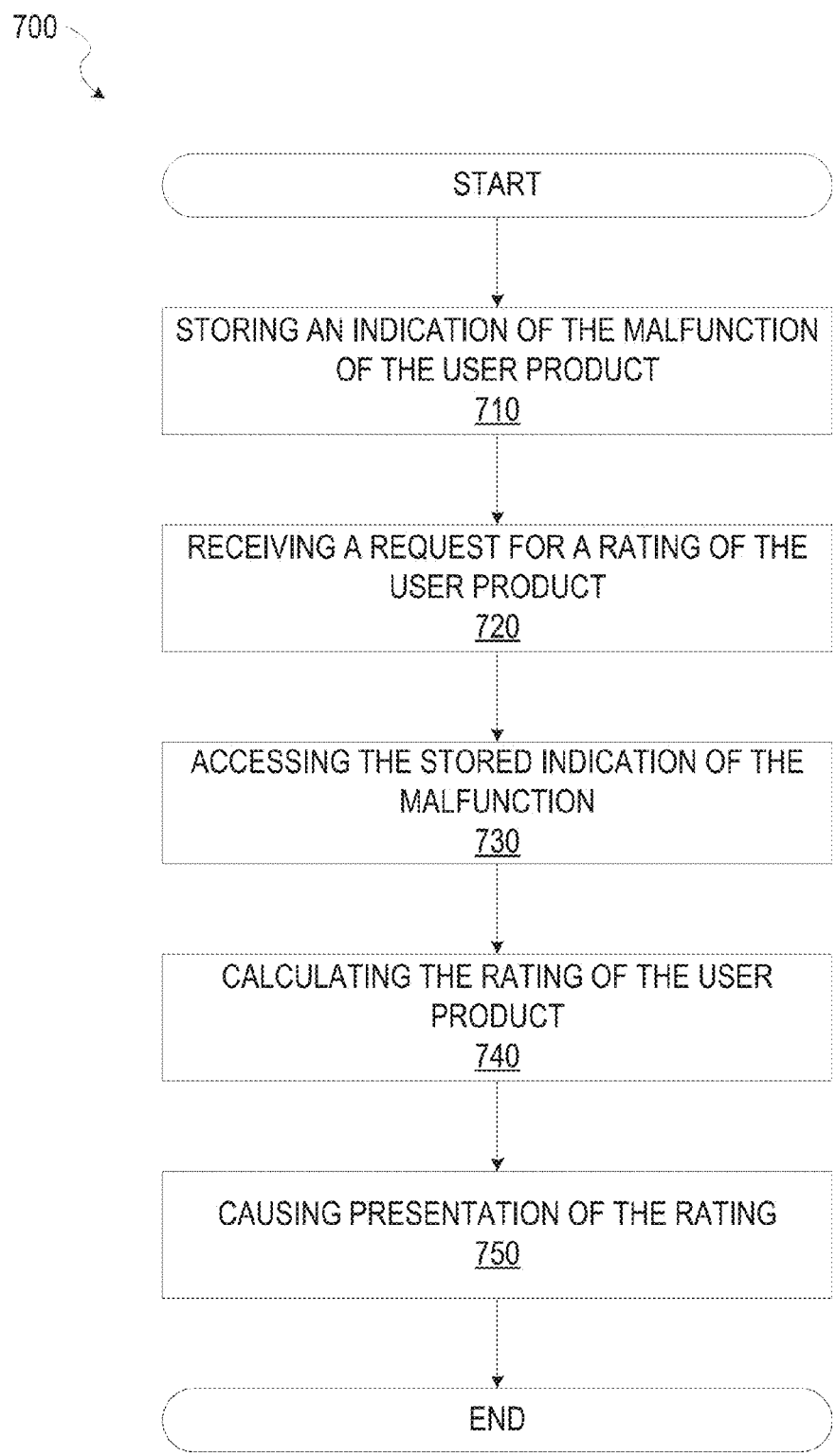
FIG. 7 is a flow diagram illustrating an example method for calculating a rating for a particular user product, according to some example embodiments.

FIG. 7 is a flow diagram illustrating an example method 700 for calculating a rating for a particular user product. The rating for the particular user product is an indication of quality (e.g., fewest malfunctions overall), durability (e.g., fewest severe malfunctions), another trait, or a combination thereof of the particular user product. For example, the rating can comprise a number value where a higher number value indicates a higher level of a particular trait (e.g., 5 indicates a quality user product with few malfunctions whereas 1 indicates a poor quality user product with many malfunctions of different components). In some embodiments, the rating for the particular user product is specific to a particular component, component group, type of malfunction, and so on. The operations of the method 700 may be performed by components of the maintenance system 150, and are so described below for the purposes of illustration.

At operation 710, the data module 230 stores the indication of the malfunction in association with a product identifier of the user product. For instance, the data module 230 stores the indication of the malfunction in a database, such as databases 126, to be subsequently accessed by the data module 230. It is to be noted that the operation 710 can be performed at a first time and the subsequent operations of the example method 700 can be performed at a later time (a second time after the first time). That is to say, the data module 230 stores the indication of the malfunction during a first session and the maintenance system 150 accesses and uses the stored indication of the malfunction during a second or subsequent sessions.

At operation 720, the communication module 220 receives a request for a rating of the user product from a second user device of a second user. The rating can assist the second user in making a decision to purchase a same or similar user product. For example, the second user may be interested in purchasing a same or similar user product and desires an objective rating of the same or similar user product that is based on malfunctions.

At operation 730, the data module 230 accesses the stored indication of the malfunction using the product identifier. In some instances, the data module 230 accesses multiple indications of malfunctions for a particular user product. For example, the data module 230 performs a lookup of the indication of the malfunction, or multiple malfunctions, in a database using the product identifier.

At operation 740, the analysis module 240 calculates the rating of the user product based on the stored indication of the malfunction. The analysis module 240 can calculate the rating comparatively. That is to say, the analysis module 240 can compare similar user products based on a number, severity, or a suitable combination thereof to calculate the rating of the user product (e.g., a particular brand washing machine has a fewest severe malfunctions as compared to washing machines with similar features). A comparative rating allows for comparison of a particular user product among a group of user products. In some instances, the analysis module 240 generates or calculates the rating based on a count of malfunctions for a particular user product or a weighted sum of the malfunctions respectively weighted with a severity score for respective malfunctions. The analysis module 240 can employ a wide variety of other schemes and techniques to calculate the rating for the user product using the indication of the malfunction and other data (e.g., user data of the user such as reviews of the user product on a social networking service).

At operation 750, presentation module 210 causes presentation of the rating of the user product on a second user interface of the second user device. For example, the rating can be a normalized number that can be used to compare similar user products.

Figure 8:
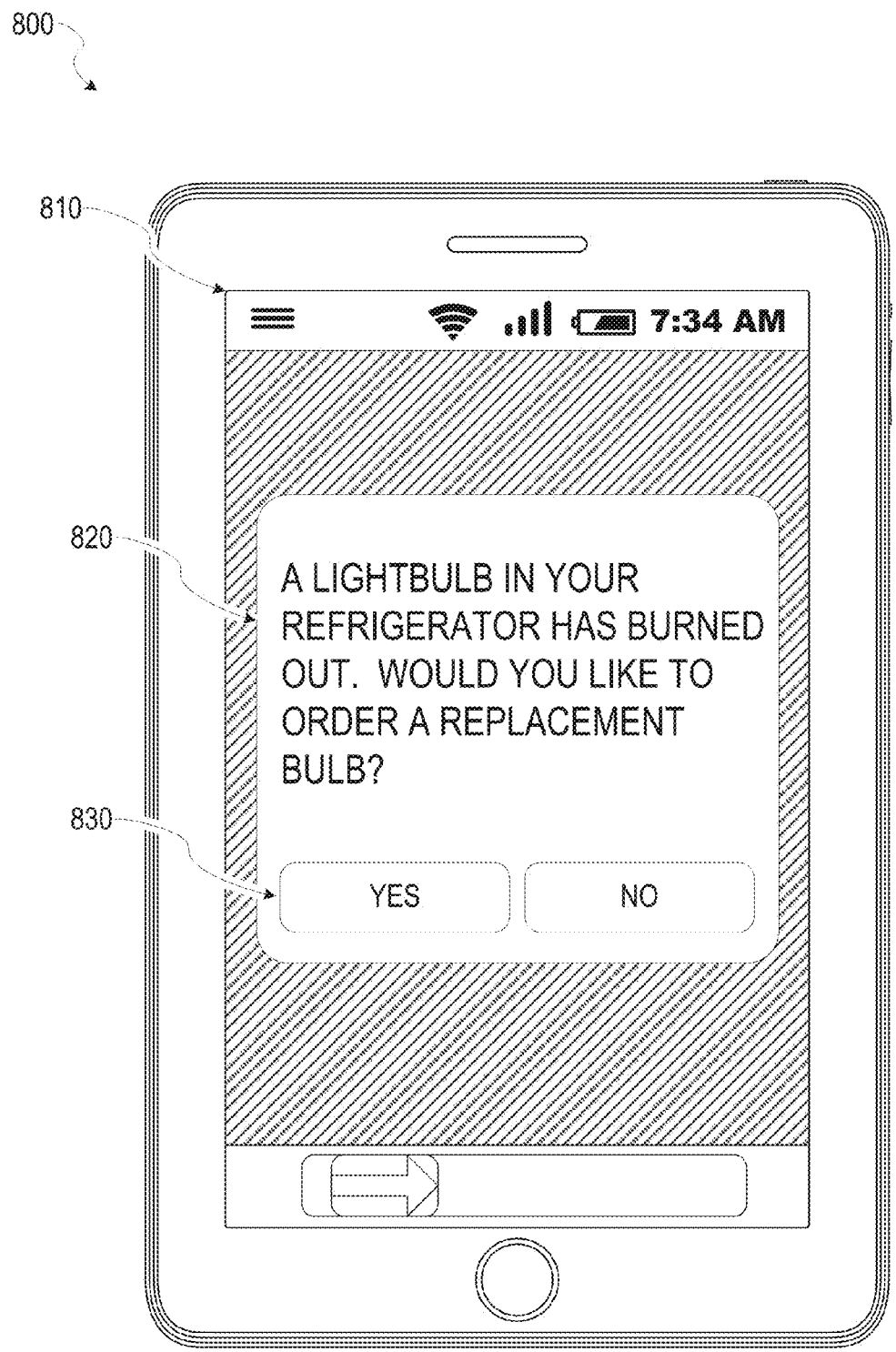
FIGS. 8-10 are user interface diagrams depicting various example user interfaces, according to some example embodiments.
Figure 9:
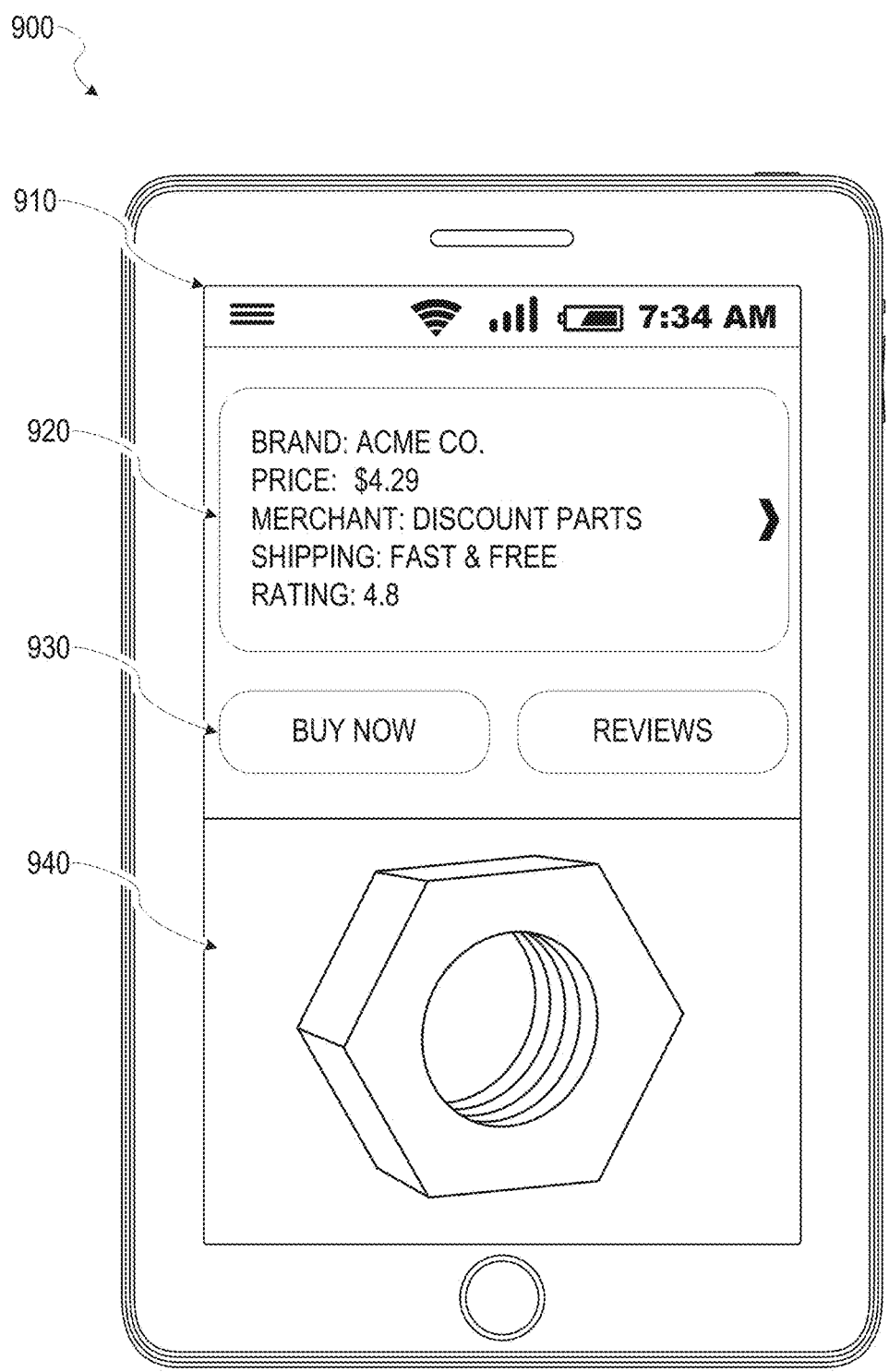
Figure 10:
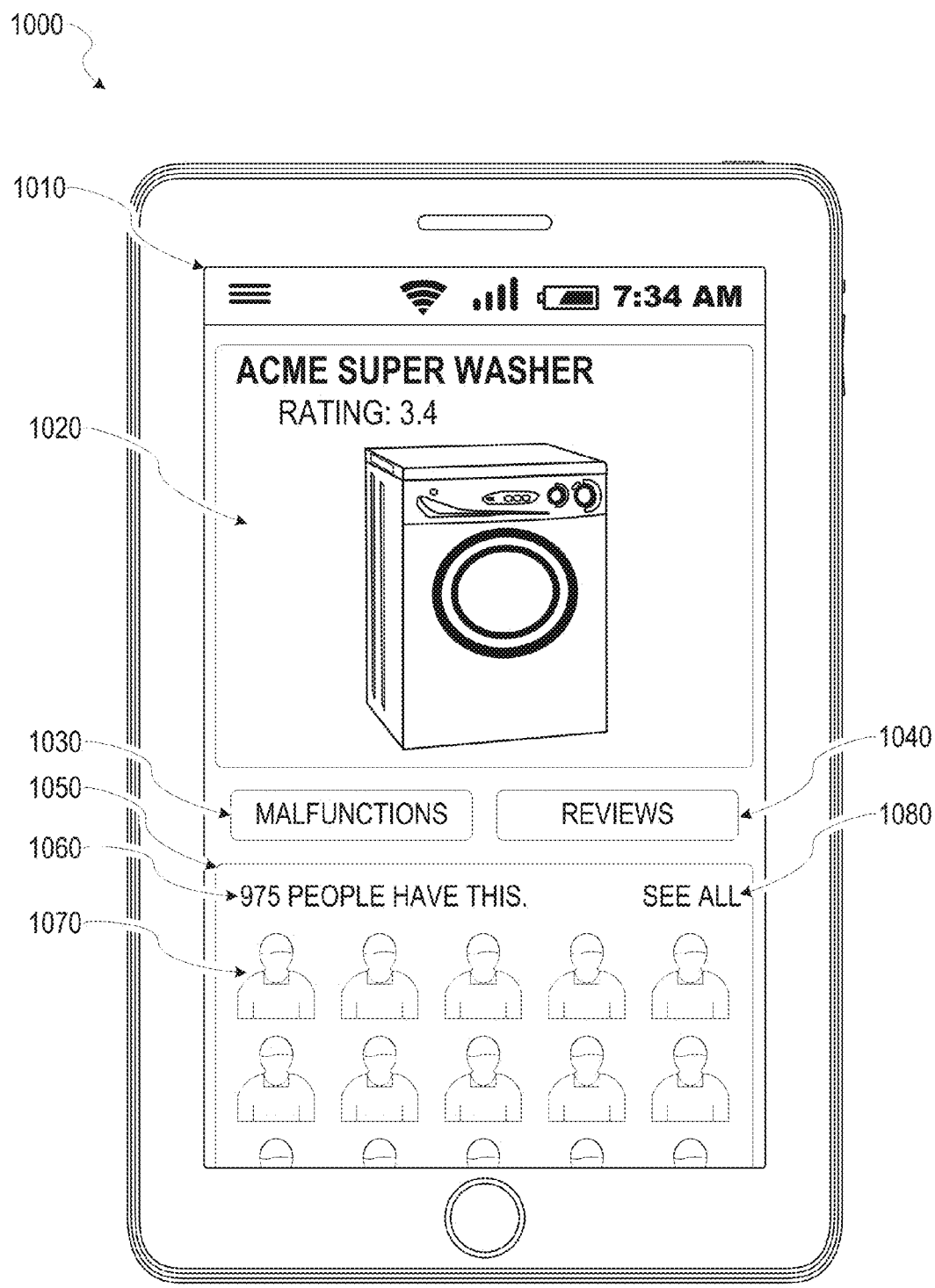

FIGS. 8-10 depict example user interfaces for interactively presenting information to the user. Although FIGS. 8-10 depict specific example user interfaces and user interface elements, these are merely non-limiting examples; many other alternate user interfaces and user interface elements can be generated by the presentation module 210 and cause to be presented to the user. It will be noted that alternate presentations of the displays of FIGS. 8-10 can include additional information, graphics, options, and so forth. Alternatively, other presentations can include less information, or provide abridged information for easy use by the user.

FIG. 8 is a user interface diagram 800 depicting an example user interface 810 for displaying a notification 820 to the user. In various example embodiments, the presentation module 210 causes presentation of the notification 820 to the user. For instance, the presentation module 210 communicates, to the user device, instructions to present the notification 820. In some instances, the instructions include notification content, generated by the presentation module 210, such as a message (e.g., pertinent information) to be presented to the user. In example embodiments, the notification 820 comprises a text message, such as Short Message Service (SMS) messages, Multimedia Messaging Service (MMS), Enhanced Messaging Service (EMS), and so forth. In other example embodiments, the notification 820 comprises a push notification or another similar type of notification. In further example embodiments, the notification 820 comprises interactive user interface elements such as user interface elements 830. In these example embodiments, the user interface elements 830 provide the user an option to make a selection (e.g., through an SMS system, mobile application). In the user interface 810, the user is provided the option to execute an order associated with a particular item listing. In the example of FIG. 8, the presentation module 210 generates the notification 820 in response to the communication module 220 receiving the indication of the malfunction of the user product as described above in connection with FIG. 4. In some embodiments activating a user interface elements on the user interface 810 causes presentation of a subsequent user interface such as those show in FIGS. 9 and 10 below (e.g., activating user interface element 830 shows the user interface of FIG. 9).

FIG. 9 is a user interface diagram 900 depicting an example user interface 910 for displaying a particular item listing. The user interface 910 includes user interface element 920, 930, and 940. The user interface element 920 includes item listing information such as brand, price, merchant, shipping, and rating score. The user interface element 930 provides the user with an option to execute an order associated with the item listing. The user interface element 940 includes an image of an item associated with the item listing. In an embodiment, activating a user interface element of the user interface 910 associated with review shows, or causes presentation of, the user interface of FIG. 10 below (to provide the user with additional information regarding ratings and reviews of a particular component or user product).

FIG. 10 is a user interface diagram 1000 depicting an example user interface 1010 for displaying a particular item listing. User interface element 1020 provides information associated with an item listing such as an item image, price, merchant, brand, other information retrieved from the publication systems 142, and the like. User interface element 1030 provides the user with an option to view malfunctions associated with the item listing (e.g., stored indications of malfunctions from user products of a plurality of users of the maintenance system 150). User interface element 1040 provides the user with an option to view reviews, ratings, or other information associated with the item listing. For instance, the maintenance system 150 can identify social network posts by users of the maintenance system 150 regarding the item of the item listing. Section 1050 displays a scrollable list of entities that are associated with the item listing. For instance, the entities of section 1050 can include users of the maintenance system 150 that own the item of the item listing. In some embodiments, the user browses the list of entities and identifies an entity to form a new social network relationship with or otherwise communicate with (e.g., communicate regarding a particular malfunction of the item of the item listing). User interface element 1060 provides information corresponding to the group of entities displayed in section 1050. In this example, the user interface element 1060 indicates a number of entities that own the item of the item listing as determined by the maintenance system 150. User interface element 1070 indicates a particular entity among the entities that owns the item of the item listing. In some embodiments, activating the user interface element 1070 provides additional information corresponding to the particular entity or initiates a request to form a social network relationship with the particular entity. User interface element 1080 provides an option to display additional entities that own the item of the item listing.

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 11:
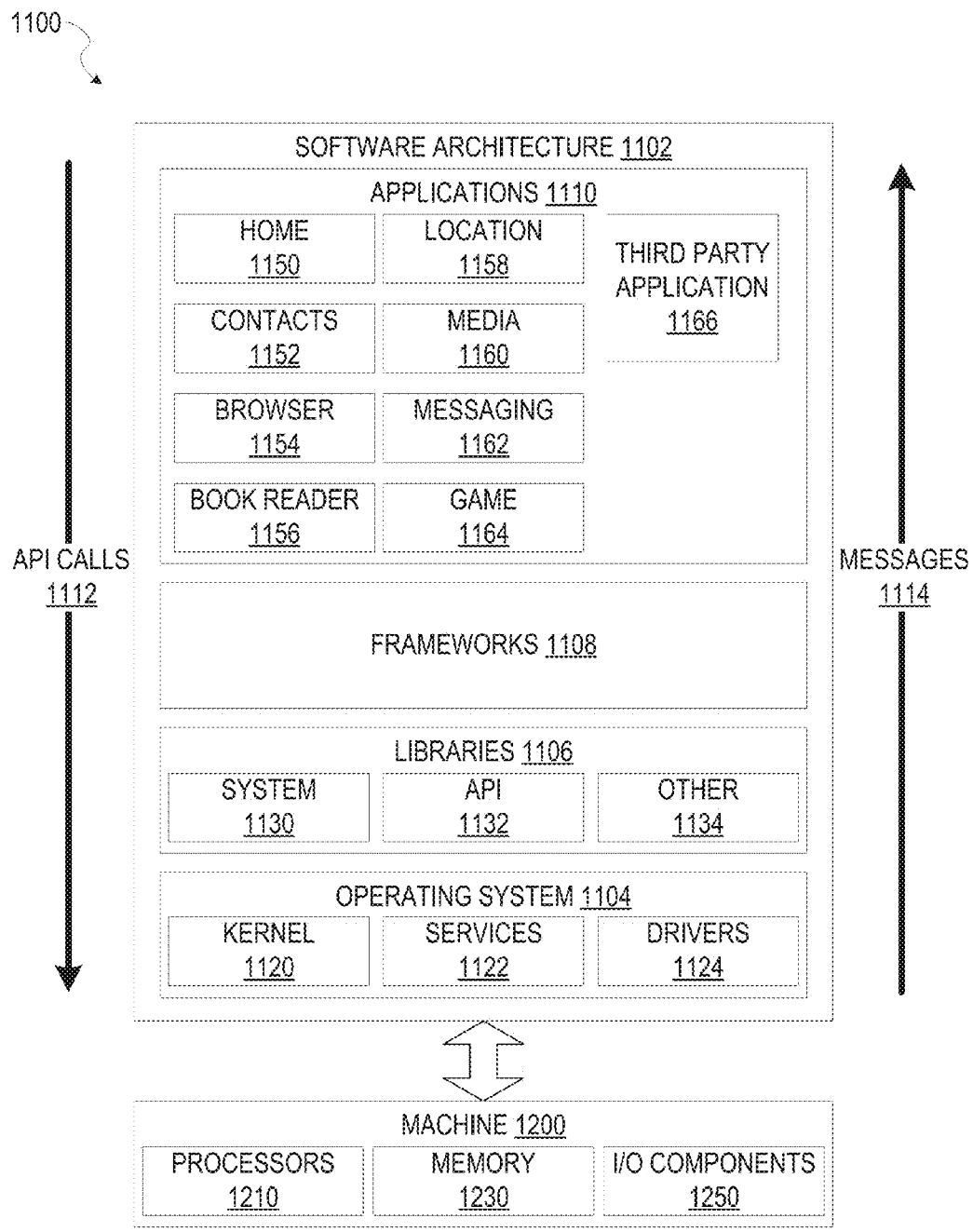
FIG. 11 is a block diagram illustrating an example of a software architecture that may be installed on a machine, according to some example embodiments.

FIG. 11 is a block diagram 1100 illustrating an architecture of software 1102, which can be installed on any one or more of the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 1166 can invoke the API calls 1112 provided by the operating system 1104 to facilitate functionality described herein.

Figure 12:
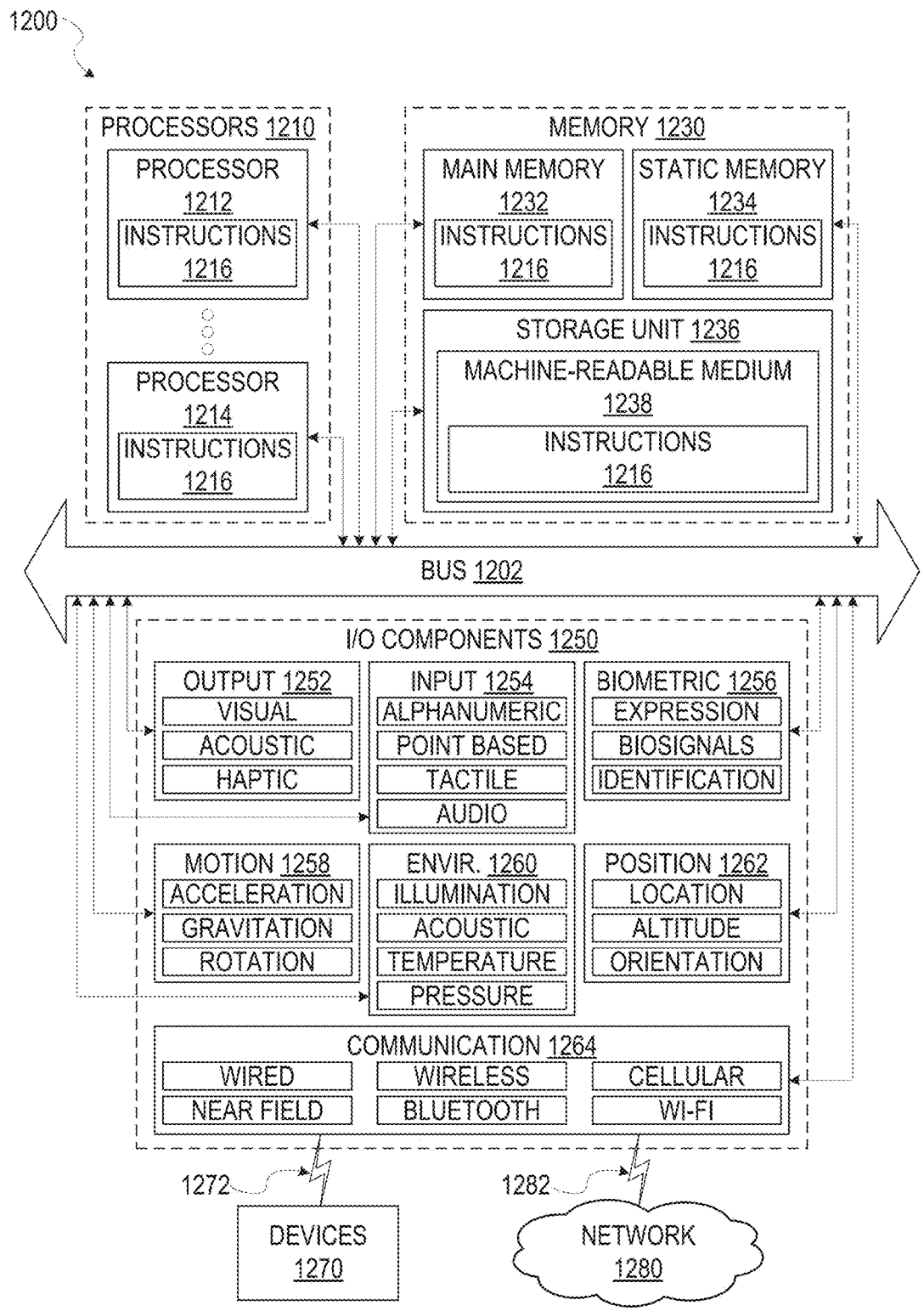
FIG. 12 is a block diagram presenting a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1212 and a processor 1214 that may execute the instructions 1216. The term "processor" is intended to include multi-core processors that may comprise two or more independent processors (also referred to as "cores") that can execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., an accelerometer), gravitation sensor components, rotation sensor components (e.g., a gyroscope), and so forth. The environmental components 1260 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTrP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a communication module configured to receive an indication of a malfunction of a product associated with a first user account;
    an analysis module, comprising at least one hardware processor of a machine, and configured to
    identify an item listing based in part on a second user account associated with the product, and
    determine that the second user account is similar to the first user account based on an identified match between a first preference associated with the first user account and a second preference associated with the second user account;
    determine an order parameter for an order corresponding to the identified item listing based on the determined similar second user account; and
    a presentation module configured to present information derived from the determined order parameter.

2. The system of claim 1, further comprising:
    a data module configured to store, at a first time, the indication of the malfunction in association with a product identifier of the product,
    wherein the communication module is further configured to receive, at a second time after the first time, a request for a rating of the product from a second device of the second user account,
    the analysis module is further configured to calculate the rating of the product based on the stored indication of the malfunction, and
    the presentation module is further configured to cause presentation of the rating of the product on a user interface of the second user device.

3. The system of claim 1, wherein the analysis module is further configured to determine satisfaction of an automatic-order rule associated with the first user account, the system further comprising:
    an order module configured to automatically perform the order corresponding to the item listing on behalf of the first user account based on the determined satisfaction of the automatic-order rule.

4. The system of claim 1, wherein the analysis module is further configured to determine a severity score for the malfunction of the product based at least in part on the determined similar second user account, wherein the severity score indicates an urgency to place the order corresponding to the item listing.

5. The system of claim 4,
    wherein the severity score is determined based further in part on a corresponding order for the item listing, the corresponding order being associated with the determined similar second user account.

6. The system of claim 1, further comprising:
    a data module configured to access calendar data associated with the first user account, and
    wherein the analysis module is further configured to
    determine candidate appointment times based on the accessed calendar data, and
    schedule a maintenance appointment associated with the order and the malfunction on behalf of the first user account based on the determined candidate appointment times.

7. A computer-implemented method comprising:
    receiving, from a product, an indication of a malfunction of the product, wherein the product is associated with a first user account;
    identifying an item listing based in part on a second user account determined associated with the product;
    determining that the second user account is similar to the first user account based on an identified match between a first preference associated with the first user account and a second preference associated with the second user account;
    determining an order parameter for an order corresponding to the identified item listing based on the determined similar second user account; and
    causing presentation of information derived from the determined order parameter.

8. The computer-implemented method of claim 7, further comprising:
    at a first time, storing the received indication of the malfunction in association with a product identifier of the product;
    at a second time after the first time, receiving a request for a rating of the product from a second device associated with the second user account;
    in response to receiving the request, assessing the stored indication of the malfunction utilizing the product identifier;

calculating the rating of the product based at least in part on the stored indication of the malfunction; and causing presentation of the calculated rating on a user interface of the second device as a response to the received request.

9. The computer-implemented method of claim 7, further comprising:

automatically executing the order corresponding to the item listing on behalf of the first user account based on the determined order parameter and a determination that an automatic order rule associated with the first user account is satisfied.

10. The computer-implemented method of claim 7, further comprising:

determining a severity score for the malfunction based on the determined similar second user account, wherein the severity score is indicative of an urgency to place the order, and the order parameter is determined based further on the determined severity score.

11. The computer-implemented method of claim 7, further comprising:

accessing calendar data associated with the first user account;

determining candidate appointment times based on the accessed calendar data; and scheduling a maintenance appointment associated with the order and the malfunction on behalf of the first user account based on the determined candidate appointment times.

12. The computer-implemented method of claim 7, further comprising:

identifying a social network service including the determined similar second user account as a member; and facilitating communication between the first user account and the determined similar second user account via the identified social network service.

13. A machine-readable medium storing instructions that, when executed by at least one processor, cause the at least one processor to perform operations comprising:

receiving an indication of a malfunction of a product associated with a first user account;

identifying an item listing associated with the malfunction of the product based at least in part on a second user account associated with the product;

determining that the second user account is similar to the first user account based on an identified match between a first preference associated with the first user account and a second preference associated with the second user account;

determining an order parameter for an order corresponding to the identified item listing based on the determined similar second user account; and causing presentation of information derived from the determined order parameter.

14. The machine-readable medium of claim 13, wherein the operations further comprise:

at a first time, storing the indication of the malfunction in association with a product identifier of the product;

at a second time after the first time, receiving a request for a rating of the product from a second device associated with the second user account;

in response to receiving the request for the rating of the product, assessing the stored indication of the malfunction utilizing the product identifier;

calculating the rating of the product based at least in part on the stored indication of the malfunction; and causing presentation of the calculated rating on a user interface of the second device.

15. The machine-readable medium of claim 13, wherein the operations further comprise:

automatically executing the order corresponding to the item listing on behalf of the first user account based on the determined order parameter and a determination that an automatic order rule associated with the first user account is satisfied.

16. The machine-readable medium of claim 13, wherein the operations further comprise:

determining a severity score for the malfunction based on the determined similar second account, wherein the severity score is indicative of an urgency to place the order, and the order parameter is determined based on the determined severity score.

17. The machine-readable medium of claim 13, wherein the operations further comprise:

accessing calendar data associated with the first user account;

determining a set of candidate appointment times based on the accessed calendar data; and based on the determined set of candidate appointment times, scheduling a maintenance appointment associated with the order and the malfunction on behalf of the first user account.

18. The machine-readable medium of claim 13, wherein the operations further comprise:

identifying a social network service having the second user account as a member; and facilitating communication between the first user account and the second user account via the identified social network service.

* * * * *